US008711768B2

(12) United States Patent
Viswanath (10) Patent No.: US 8,711,768 B2
(45) Date of Patent: Apr. 29, 2014

(54) SERVING BASE STATION SELECTION BASED ON BACKHAUL CAPABILITY

(75) Inventor: Pramod Viswanath, Urbania, IL (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 12/354,300

(22) Filed: Jan. 15, 2009

(65) Prior Publication Data

US 2009/0180428 A1 Jul. 16, 2009

Related U.S. Application Data

(60) Provisional application No. 61/021,534, filed on Jan. 16, 2008.

(51) Int. Cl.
*H04W 4/00* (2009.01)
(52) U.S. Cl.
USPC .......................................... 370/328
(58) Field of Classification Search
USPC ......... 370/203, 204–215, 229–253, 310–337, 370/338–350, 395.1, 395.3, 395.4, 395.41, 370/395.42, 395.5, 395.52, 395.53, 370/412–421, 431–529, 523–520
See application file for complete search history.

(56) References Cited

U.S. PATENT DOCUMENTS

| | | | | |
|---|---|---|---|---|
| 6,157,626 A * | 12/2000 | Nakamura et al. | ............. | 370/328 |
| 6,219,539 B1 * | 4/2001 | Basu et al. | .................... | 455/417 |
| 7,620,003 B2 * | 11/2009 | Ramachandran | ............. | 370/315 |
| 2003/0125067 A1 * | 7/2003 | Takeda et al. | ................ | 455/522 |
| 2004/0192204 A1 * | 9/2004 | Periyalwar et al. | ............. | 455/25 |
| 2004/0242154 A1 * | 12/2004 | Takeda et al. | .................... | 455/16 |
| 2005/0169183 A1 * | 8/2005 | Lakkakorpi et al. | ........... | 370/238 |
| 2005/0181795 A1 * | 8/2005 | Mark et al. | ..................... | 455/436 |
| 2005/0232212 A1 * | 10/2005 | Kang et al. | ..................... | 370/338 |
| 2006/0276176 A1 * | 12/2006 | Lee et al. | ...................... | 455/411 |
| 2006/0286996 A1 * | 12/2006 | Julian et al. | .................... | 455/522 |
| 2007/0042799 A1 * | 2/2007 | Jubin et al. | ..................... | 455/522 |
| 2007/0178831 A1 * | 8/2007 | Takeda et al. | ..................... | 455/7 |
| 2007/0183321 A1 * | 8/2007 | Takeda et al. | ................. | 370/229 |
| 2007/0189221 A1 * | 8/2007 | Isobe et al. | .................... | 370/331 |
| 2008/0056172 A1 * | 3/2008 | Nakatsugawa | ................ | 370/315 |
| 2008/0056174 A1 * | 3/2008 | Jung et al. | ...................... | 370/315 |
| 2008/0062911 A1 * | 3/2008 | Choi et al. | ...................... | 370/315 |
| 2008/0084856 A1 * | 4/2008 | Ramachandran | ............. | 370/342 |
| 2008/0090575 A1 * | 4/2008 | Barak et al. | .................... | 455/444 |
| 2008/0176531 A1 * | 7/2008 | Komatsu | ......................... | 455/406 |
| 2008/0212516 A1 * | 9/2008 | Son et al. | ....................... | 370/315 |
| 2009/0017869 A1 * | 1/2009 | Hermansson et al. | ......... | 455/561 |
| 2009/0061892 A1 * | 3/2009 | Lee et al. | .................... | 455/456.1 |
| 2009/0061937 A1 * | 3/2009 | Rajasimman et al. | ........ | 455/561 |
| 2009/0093252 A1 * | 4/2009 | Czaja et al. | ..................... | 455/436 |
| 2010/0091669 A1 * | 4/2010 | Liu et al. | ........................ | 370/252 |
| 2010/0260068 A1 * | 10/2010 | Bhatt et al. | ..................... | 370/254 |
| 2010/0285803 A1 * | 11/2010 | Persson et al. | ................. | 455/436 |
| 2011/0092214 A1 * | 4/2011 | Iwamura | ........................ | 455/438 |

* cited by examiner

*Primary Examiner* — Jung-Jen Liu
(74) *Attorney, Agent, or Firm* — Tyler J. Overall (57) ABSTRACT

Techniques for selecting a serving base station for a terminal by taking into account backhaul capability are described. The terminal may be within the coverage of multiple base stations, which may be of different types and may have different backhaul capabilities. One of the base stations may be selected as a serving base station for the terminal based on the backhaul capabilities of these base stations. The serving base station may also be selected based on additional criteria such as data or delay requirements of the terminal, transmit power capability of the terminal, characteristics of data for the terminal, etc.

23 Claims, 3 Drawing Sheets

SERVING BASE STATION SELECTION BASED ON BACKHAUL CAPABILITY

The present application claims priority to provisional U.S. Application Ser. No. 61/021,534, entitled "APPARATUS AND METHOD TO ENABLE ASSOCIATION WITH AN ACCESS POINT BASE STATION BASED ON BACKHAUL QUALITY PARAMETERS," filed Jan. 16, 2008, assigned to the assignee hereof and incorporated herein by reference.

BACKGROUND

I. Fields

The present disclosure relates generally to communication, and more specifically to techniques for selecting a serving base station in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may be within the coverage of multiple base stations. It is desirable to select a suitable base station to serve the terminal so that good performance can be achieved.

SUMMARY

Techniques for selecting a serving base station for a terminal by taking into account backhaul capability are described herein. The terminal may be within the coverage of multiple base stations, which may be of different types and may have different backhaul capabilities. One of the base stations may be selected as a serving base station for the terminal based on the backhaul capabilities of these base stations. In one design, an overall transmission capability of each base station may be determined based on (i) the transmission capability of a wireless link from the terminal to the base station and (ii) the transmission capability of a wireless or wireline backhaul link for the base station. The base station with the largest overall transmission capability may be selected as the serving base station for the terminal.

The serving base station may also be selected based on additional criteria. In one design, the serving base station may be selected based further on data or delay requirements of the terminal. For example, each base station that is unable to meet the data or delay requirements may be removed from consideration. One of the remaining base stations may then be selected as the serving base station, e.g., based on the backhaul capabilities of the remaining base stations. In another design, the serving base station may be selected based further on transmit power capability of the terminal. In yet another design, the serving base station may be selected based further on characteristics of data for the terminal.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies given above as well as other wireless networks and radio technologies.

Figure 1:
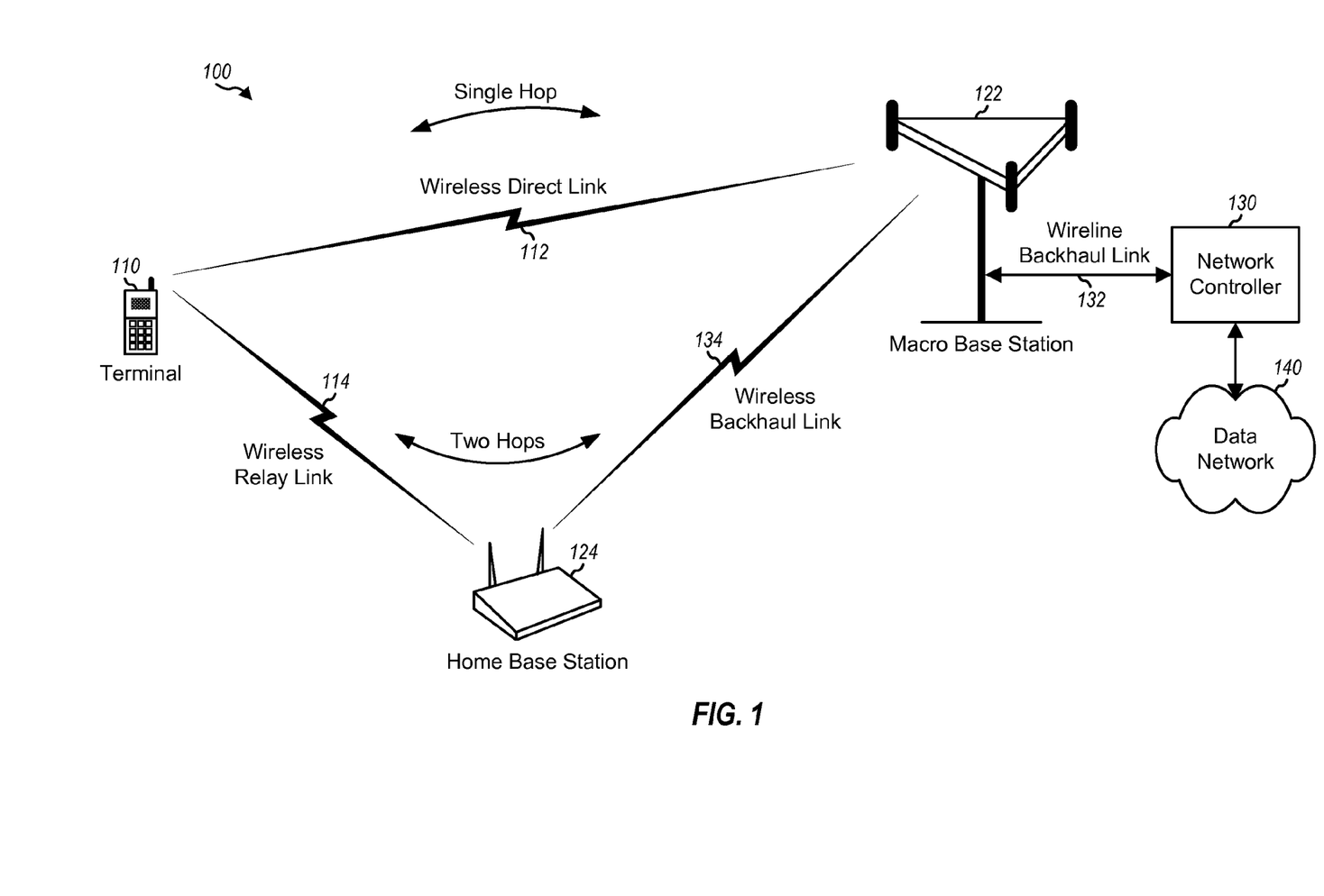
FIG. 1 shows a wireless communication network.

FIG. 1 shows a wireless communication network 100, which may include a number of base stations and other network entities. For simplicity, only two base stations 122 and 124 and one network controller 130 are shown in FIG. 1. A base station is a station that communicates with the terminals and may also be referred to as an access point, a Node B, an evolved Node B (eNB), etc. A base station may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, or some other type of cell. A macro cell may cover a relatively large geographic area (e.g., several kilometers in radius) and may support communication for terminals with service subscription in the wireless network. A pico cell may cover a relatively small geographic area and may support communication for terminals with service subscription. A femto cell may cover a relatively small geographic area (e.g., a home) and may support communication for terminals having association with the femto cell, e.g., terminals belonging in a closed subscriber group (CSG). The CSG may include terminals for users in a home, terminals for users subscribing to a special service plan offered by a network operator, etc. A base station for a macro cell may be referred to as a macro base station. A base station for a pico cell may be referred to as a pico base station. A base station for a femto cell may be referred to as a femto base station or a home base station.

In FIG. 1, base station 122 may be a macro base station with a wireline backhaul link 132. Base station 124 may be a home base station without a wireline backhaul link and may communicate with base station 122 via a wireless backhaul link 134. A backhaul link is a communication link between a base station and a network entity or a data network. A wireline backhaul link is a backhaul link that may be implemented with digital subscriber line (DSL), cable, fiber optic, or some other wireline connection. A wireless backhaul link is a backhaul link that may be implemented with any radio technology.

Network controller 130 may couple to a set of base stations and provide coordination and control for these base stations. Network controller 130 may be coupled to a data network 140 and/or other network entities. Data network 140 may include a private network (e.g., a core network of a network operator) and/or a public network (e.g., the Internet).

A terminal 110 may be one of many terminals supported by wireless network 100. Terminal 110 may be stationary or mobile and may also be referred to as an access terminal, a mobile station, a user equipment (UE), a subscriber unit, a station, etc. Terminal 110 may be a cellular phone, a personal digital assistant (PDA), a wireless modem, a wireless communication device, a handheld device, a laptop computer, a cordless phone, a wireless local loop (WLL) station, etc. Terminal 110 may communicate with a base station via the downlink and uplink. The downlink (or forward link) refers to the communication link from the base station to the terminal, and the uplink (or reverse link) refers to the communication link from the terminal to the base station.

In FIG. 1, terminal 110 may detect base stations 122 and 124. Terminal 110 may be able to communicate with base station 122 via a wireless direct link 112 or with base station 124 via a wireless relay link 114. The number of hops for each base station may be given by the number of wireless links from terminal 110 via that base station to a wireline backhaul link. Terminal 110 may thus have single-hop communication with base station 122 via wireless direct link 112. Terminal 110 may have two-hop communication with base station 124 via wireless relay link 114 and wireless backhaul link 134. More than two hops may also be possible but is not shown in FIG. 1 for simplicity.

Terminal 110 may have data to send on the uplink and/or a base station may have data to send to terminal 110 on the downlink. The data for each link may be processed as belonging to data flows. For example, one set of data flows may be supported for the uplink, and another set of data flows may be supported for the downlink. The data flows may correspond to application layer flows, Transmission Control Protocol (TCP) flows, Internet Protocol (IP) flows, Radio Link Control (RLC) or Radio Link Protocol (RLP) flows, Medium Access Control (MAC) flows, etc. TCP, IP, RLC/RLP and MAC are protocols at different layers in a protocol stack. Data flows at different layers may be associated with different characteristics and may be processed in different manners.

In general, each data flow may include any type of data (e.g., traffic data, signaling data, etc.) and may be associated with certain data requirements. The data requirements may include requirements for data rate, delay, error rate, and/or other quality-of-service (QoS) metrics. Any number of data flows may be supported, and the data flows may have different data requirements. For example, a first data flow may carry traffic data for Voice-over-IP (VOIP) and may be associated with certain data rate and delay requirements. A second data flow may carry traffic data for email and data download and may have best effort characteristics. A third data flow may carry signaling data and may be associated with certain delay requirements. A fourth data flow may carry acknowledgement and/or other feedback information and may be associated with data rate and/or delay requirements. Buffering and flow control may be performed separately for each data flow in order to meet the data requirements of the data flow.

Referring back to FIG. 1, terminal 110 may be within the coverage of base stations 122 and 124. Macro base station 122 may be part of a wireless network operated by a network operator. Home base station 124 may be part of a small scale home network that may be set up by a user. Terminal 110 may be able to operate in both the macro cellular environment and the residential network environment. One base station may be selected to serve terminal 110. In one design, the base station that is nearest to terminal 110 (e.g., has the lowest pathloss to terminal 110) and with which terminal 110 can associate may be selected as the serving base station. This design may lead to use of lower transmit power for data transmission between the selected base station and terminal 110, which may result in lower interference in the wireless network.

However, some base stations (e.g., base station 124) may be deployed in an unplanned manner (e.g., in a plug-and-play scenario) and may not have wireline backhaul links. This unplanned deployment may become more common as users continue to replace fixed line communication devices with portable home base stations in order to obtain better quality, more reliable service, and lower prices. These home base stations may need to communicate via wireless backhaul links with other base stations having wireline backhaul links. Furthermore, the wireless backhaul links and the wireless relay links for these base stations may operate on the same frequency channel, and the available radio resources would need to be split between the wireless relay links and the wireless backhaul links. In such a deployment, selecting the nearest base station with the lowest pathloss as the serving base station may not provide good performance. In fact, it may be more advantageous for terminal 110 to connect to a distant base station with a wireline backhaul link than to connect to a closer base station with a wireless backhaul link. Connecting to the distance base station may be more advantageous for the following reasons:

1. Multi-hop communication with the closer base station may result in more interference (at least statistically) than single-hop communication with the distance base station, and
2. Multi-hop communication with the closer base station may result in longer overall delay for data to reach the eventual destination since each hop may be associated with some delay.

In an aspect, a serving base station may be selected for terminal 110 based on backhaul capabilities of the available base stations and possibly additional criteria such as data requirements of the terminal. The backhaul capability of a base station may be given by transmission capability (e.g., an aggregate data rate supported by the base station), delay capability (e.g., overall delay in forwarding data by the base station), the number of hops for the base station, and/or other metrics. The data requirements may be given by delay requirements, data rate requirements, etc.

In one design, the following parameters may be considered in selecting a serving base station:

1. Delay requirements of data for terminal 110,
2. How packets associated with a single data flow are treated,
3. Backhaul capability of each base station under consideration, and
4. Transmit power capability of terminal 110.

The data for terminal 110 may be classified in terms of an "elephant-mice" model. A majority of packets may belong to few data flows and may be referred to as "elephant" data. A small percentage of the total packets may belong to a majority of data flows and may be referred to as "mice" data. Elephant data may include traffic data whereas mice data may include signaling data. In one design, multi-hop communication may be considered only for elephant data and not for mice data.

Most base stations may perform queuing for each data flow, and information on the queuing mechanism used by the base stations may be readily available. It may be useful to treat packets of the same data flow in similar manner. This may help outer congestion control loops to be better behaved. Along this line, it may be useful to transmit TCP acknowledgements (Acks) though mice packets in a similar route. This way, TCP/IP congestion control mechanism may not ramp up the flow rate.

The first two parameters and the last two parameters given above may be considered as belonging to two separate categories. The first two parameters may be dependent on the characteristics of the data being sent. In one design, the first two parameters may be used to determine whether a base station can be selected as a serving base station for terminal 110. For example, if the delay requirements of the data are stringent, then home base station 124 with two hops may be removed from consideration if the longer delay of base station 124 would result in failure to meet the delay requirements of the data. As another example, if the data rate requirements are high, then a base station with low transmission capability may be removed from consideration.

The last two parameters may be used to determine when multi-hop communication via home base station 124 with wireless backhaul link 134 is preferred over single hop communication via macro base station 122 with wireline backhaul link 132. In one design, multi-hop may be preferred when the transmit power capability of terminal 110 is very low and/or when the backhaul capability of home base station 124 is much higher than the transmission capability of wireless direct link 112 from terminal 110 to macro base station 122. If the transmit power capability of terminal 110 is very low, then the wireless link from terminal 110 to the selected base station may be the limiting factor in performance. Hence, it may be desirable to select home base station 124 since wireless relay link 114 for home base station 124 may be better than wireless direct link 112 for macro base station 122. If the backhaul capability of home base station 124 is much better than the transmission capability of wireless direct link 112 for macro base station 122, then wireless backhaul link 134 will not be the limiting factor in performance.

In one design, single hop may be preferred when the backhaul capability of home base station 124 is comparable to the transmission capability of wireless direct link 112 from terminal 110 to macro base station 122. This may be the case if (i) terminal 110 and home base station 124 are both about the same distance from macro base station 122 (not shown in FIG. 1), (ii) terminal 110 and home base station 124 are relatively close to each other, and (iii) home base station 124 has wireless backhaul link 134 with macro base station 122. In this case, the transmission capability of wireless backhaul link 134 may be comparable to the transmission capability of wireless direct link 112. It may thus be preferable for terminal 110 to communicate directly with macro base station 122 instead of via home base station 124.

In one design, an overall transmission capability for each detected base station may be determined based on (i) the transmission capability of the wireless direct or relay link from terminal 110 to the base station and (ii) the transmission capability of the wireless or wireline backhaul link for the base station. The transmission capability of the wireless direct or relay link may be dependent on the transmit power capability of terminal 110 and the pathloss to the base station. The transmission capability of a wireline backhaul link may be high or assumed to be high. The transmission capability of a wireless backhaul link may be dependent on (i) the transmit power of the base station with the wireless backhaul link and (ii) the pathloss from this base station to the base station with a wireline backhaul link. A set of overall transmission capabilities may be obtained for a set of base stations detected by terminal 110. The base station with the best overall transmission capability may be selected as the serving base station for terminal 110.

In one design, terminal 110 may select a serving base station for itself. Terminal 110 may detect a set of base stations and may determine the backhaul capability of each detected base station. A base station may broadcast its backhaul capability and possibly the backhaul capabilities of neighbor base stations via broadcast information. Terminal 110 may receive the broadcast information and determine the backhaul capability of each base station for which this information is available. Terminal 110 may also assume that a base station has a wireline backhaul link and high backhaul capability if the backhaul capability of the base station is not known or is not ascertainable. Terminal 110 may then select the serving base station based on the backhaul capabilities of all detected base stations and possibly other information.

In another design, a base station may select a serving base station for terminal 110. The base station may receive a list of base stations detected by terminal 110. This list may be sent in a pilot report by terminal 110. The base station may determine the backhaul capability of each detected base station, which may be included in the pilot report or ascertained by the base station in other manners (e.g., via backhaul exchanges). The base station may then select the serving base station based on the backhaul capabilities of all detected base stations and possibly other information.

Figure 2:
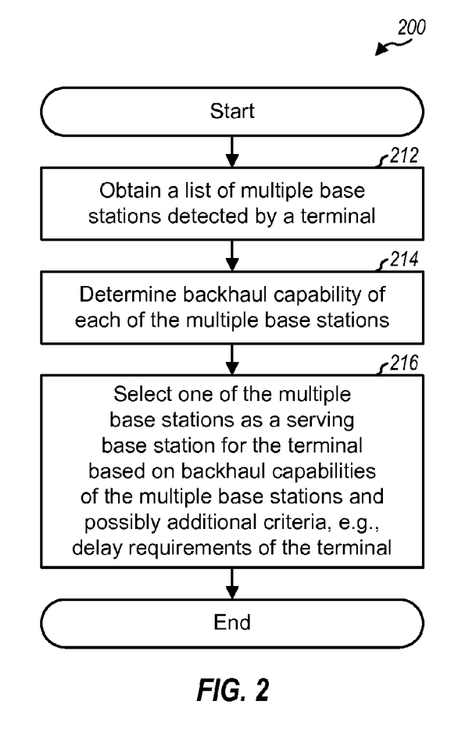
FIG. 2 shows a process for selecting a serving base station.

FIG. 2 shows a design of a process 200 for selecting a serving base station. A list of multiple base stations detected by a terminal may be obtained (block 212). In one design, the multiple base stations may comprise at least two types of base stations, e.g., at least one macro base station and at least one home base station. The backhaul capability of each of the multiple base stations may be determined (block 214). The backhaul capability of each base station may comprise transmission capability of a wireless or wireline backhaul link for that base station, delay capability of the base station in forwarding data, the number of hops for the base station, etc. Transmission capability may be given by an aggregate data rate or some other metric. In any case, one of the multiple base stations may be selected as a serving base station for the terminal based on the backhaul capabilities of the multiple base stations and possibly additional criteria (block 216). The selected base station may serve the terminal for only the downlink, or only the uplink, or both the downlink and uplink.

The multiple base stations may comprise a first base station (e.g., macro base station 122) with a single hop and a second base station (e.g., home base station 124) with multiple hops. In one design, the first base station may be selected as the serving base station if the transmission capability of a wireless backhaul link from the second base station to the first base station is not greater than the transmission capability of a wireless direct link from the terminal to the first base station by a predetermined amount, e.g., a predetermined factor or percentage. In one design, the second base station may be selected as the serving base station if the transmission capability of the wireless backhaul link from the second base station to the first base station exceeds the transmission capability of the wireless direct link from the terminal to the first base station by the predetermined amount. In one design, the first or second base station may be selected based on the amount of data for each of multiple data flows for the terminal. For example, the second base station may be selected if the majority of the data (or elephant data) is sent in few data flows.

In one design, an overall transmission capability of each of the multiple base stations may be determined based on (i) the transmission capability of a wireless direct or relay link for the base station and (ii) the transmission capability of a wireless or wireline backhaul link for the base station. The base station with the largest overall transmission capability may then be selected as the serving base station.

The serving base station may also be selected based on additional criteria. In one design, the serving base station may be selected based further on data requirements of the terminal. The data requirements may comprise data rate requirements, delay requirements, etc. For example, each base station that is unable to meet the data requirements may be removed from consideration. One of the remaining base stations may then be selected as the serving base station, e.g., based on the backhaul capabilities of the remaining base stations.

In another design, the serving base station may be selected based further on delay requirements of the terminal. For example, each base station that is unable to meet the delay requirements may be removed from consideration. One of the remaining base stations may then be selected as the serving base station, e.g., based on the backhaul capabilities of the remaining base stations.

In yet another design, the serving base station may be selected based further on transmit power capability of the terminal. For example, if the terminal has low transmit power capability, then this may favor selection of a base station located closer to the terminal, assuming that the backhaul capability of this base station is not limiting performance.

In one design, the serving base station may be selected by the terminal. The terminal may receive broadcast information from at least one of the multiple base stations. The terminal may determine the backhaul capability of each base station based on the broadcast information. The terminal may also determine the backhaul capability of each base station in other manners.

In another design, the serving base station may be selected by one of the multiple base stations. In yet another design, the serving base station may be selected by a network entity, e.g., network controller 130. For both designs, the entity designated to select the serving base station may receive the list of multiple base stations from the terminal. This entity may determine the backhaul capability of each base station based on (i) information sent by the terminal, which may obtain the information from the base stations, (ii) backhaul information exchanged between the entity and the base stations, and/or (iii) other information obtained by the entity in other manners.

Figure 3:
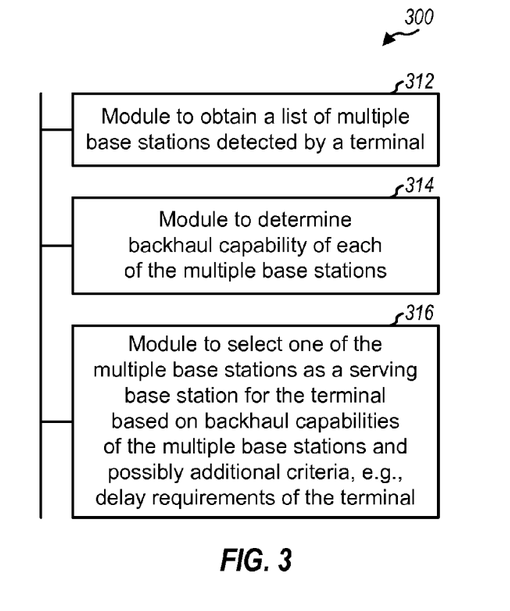
FIG. 3 shows an apparatus for selecting a serving base station.

FIG. 3 shows a design of an apparatus 300 for selecting a serving base station. Apparatus 300 includes a module 312 to obtain a list of multiple base stations detected by a terminal, a module 314 to determine backhaul capability of each of the multiple base stations, and a module 316 to select one of the multiple base stations as a serving base station for the terminal based on the backhaul capabilities of the multiple base stations and possibly additional criteria, e.g., delay requirements of the terminal.

The modules in FIG. 3 may comprise processors, electronics devices, hardware devices, electronics components, logical circuits, memories, software codes, firmware codes, etc., or any combination thereof.

Figure 4:
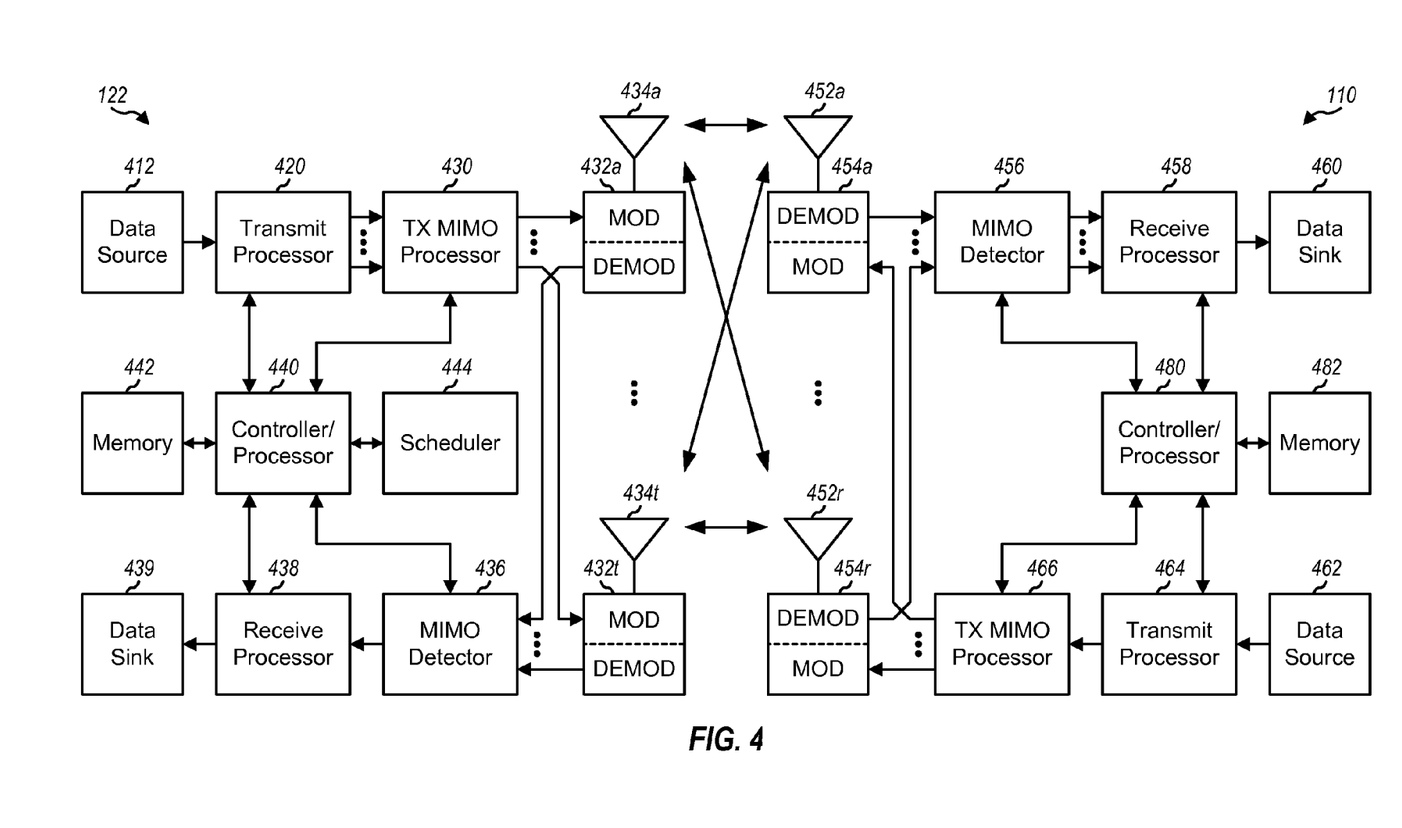
FIG. 4 shows a block diagram of a base station and a terminal

FIG. 4 shows a block diagram of a design of base station 122 and terminal 110 in FIG. 1. Base station 124 may be implemented in similar manner as base station 122 and is not shown in FIG. 4 for simplicity. In the design shown in FIG. 4, base station 122 is equipped with T antennas 434a through 434t, and terminal 110 is equipped with R antennas 452a through 452r, where in general T≥1 and R≥1.

At base station 122, a transmit processor 420 may receive traffic data and signaling data from a data source 412 and broadcast data from a controller/processor 440. The broadcast data may comprise information on backhaul capability of base station 122. Transmit processor 420 may process (e.g., encode, interleave, and modulate) the traffic data, signaling data, and broadcast data and provide data symbols. A transmit (TX) multiple-input multiple-output (MIMO) processor 430 may perform spatial processing (e.g., precoding) on the data symbols and/or pilot symbols, if applicable, and may provide T output symbol streams to T modulators (MODs) 432a through 432t. Each modulator 432 may process a respective output symbol stream (e.g., for OFDM, SC-FDM, CDMA, etc.) to obtain an output sample stream. Each modulator 432 may further process (e.g., convert to analog, amplify, filter, and upconvert) the output sample stream to obtain a downlink signal. T downlink signals from modulators 432a through 432t may be transmitted via T antennas 434a through 434t, respectively.

At terminal 110, antennas 452a through 452r may receive the downlink signals from base station 122 and may provide received signals to demodulators (DEMODs) 454a through 454r, respectively. Each demodulator 454 may condition (e.g., filter, amplify, downconvert, and digitize) a respective received signal to obtain received samples. Each demodulator 454 may further process the received samples (e.g., for OFDM, SC-FDM, CDMA, etc.) to obtain received symbols. A MIMO detector 456 may obtain received symbols from all R demodulators 454a through 454r, perform MIMO detection on the received symbols if applicable, and provide detected symbols. A receive processor 458 may process (e.g., demodulate, deinterleave, and decode) the detected symbols, provide decoded traffic data for terminal 110 to a data sink 460, and provide decoded signaling and broadcast data to a controller/processor 480.

On the uplink, at terminal 110, a transmit processor 464 may receive and process traffic data from a data source 462 and signaling data from controller/processor 480 and provide data symbols. The data symbols from transmit processor 464 may be precoded by a TX MIMO processor 466 if applicable, further processed by modulators 454a through 454r, and transmitted to base station 122. At base station 122, the uplink signals from terminal 110 may be received by antennas 434, processed by demodulators 432, detected by a MIMO detector 436 if applicable, and further processed by a receive processor 438 to obtain the traffic data and signaling data transmitted by terminal 110.

Controllers/processors 440 and 480 may direct the operation at base station 122 and terminal 110, respectively. Processor 440 and/or other processors and modules at base station 122 may perform or direct process 200 in FIG. 2 and/or other processes for the techniques described herein. Processor 480 and/or other processors and modules at terminal 110 may also perform or direct process 200 in FIG. 2 and/or other processes for the techniques described herein. Memories 442 and 482 may store data and program codes for base station 122 and terminal 110, respectively. A scheduler 444 may schedule terminals for data transmission on the downlink and/or uplink and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    obtaining a list of multiple base stations detected by a terminal;
    determining backhaul capability of each of the multiple base stations, the backhaul capability being determined from one or both of an aggregate data rate or a transmission delay between each respective base station and a data network; and
    selecting one of the multiple base stations as a serving base station for the terminal based on backhaul capabilities of the multiple base stations, wherein the selecting one of the multiple base stations comprises:
        determining an overall transmission capability of each of the multiple base stations based on transmission capability of a wireless direct or relay link for the base station and transmission capability of a wireless or wireline backhaul link for the base station, and
        selecting a base station with a largest overall transmission capability as the serving base station.

2. The method of claim 1, wherein the determining backhaul capability of each of the multiple base stations comprises
    receiving broadcast information from at least one of the multiple base stations, and
    determining the backhaul capability of each base station based on the broadcast information.

3. The method of claim 1, wherein the selecting one of the multiple base stations comprises selecting one of the multiple base stations based further on data requirements of the terminal.

4. The method of claim 1, wherein the selecting one of the multiple base stations comprises selecting one of the multiple base stations based further on delay requirements of the terminal.

5. The method of claim 4, wherein the selecting one of the multiple base stations based further on delay requirements of the terminal comprises     removing from the list each of the multiple base stations unable to meet the delay requirements of the terminal, and     selecting one of remaining base stations as the serving base station based on backhaul capabilities of the remaining base stations.

6. The method of claim 1, wherein the selecting one of the multiple base stations comprises selecting one of the multiple base stations based further on transmit power capability of the terminal.

7. The method of claim 1, wherein the multiple base stations comprise a first base station with a single hop between the terminal and a wireline backhaul link and a second base station with multiple hops between the terminal and the wireline backhaul link.

8. The method of claim 7, wherein the selecting one of the multiple base stations comprises selecting the first base station as the serving base station if transmission capability of a wireless backhaul link from the second base station to the first base station is not greater by a predetermined amount than transmission capability of a wireless link from the terminal to the first base station.

9. The method of claim 7, wherein the selecting one of the multiple base stations comprises selecting the second base station as the serving base station if transmission capability of a wireless backhaul link from the second base station to the first base station exceeds by a predetermined amount transmission capability of a wireless link from the terminal to the first base station.

10. The method of claim 7, wherein the selecting one of the multiple base stations comprises selecting the first or second base station based on an amount of data for each of multiple data flows for the terminal.

11. The method of claim 1, wherein the multiple base stations comprise at least two types of base stations.

12. The method of claim 1, wherein the multiple base stations comprise at least one macro base station and at least one home base station.

13. The method of claim 1, wherein the serving base station is selected by the terminal.

14. The method of claim 1, wherein the serving base station is selected by one of the multiple base stations.

15. An apparatus for wireless communication, comprising:
    at least one processor configured to:
        obtain a list of multiple base stations detected by a terminal,
        determine backhaul capability of each of the multiple base stations, the processor configured to determine the backhaul capability from one or both of an aggregate data rate or a transmission delay between each respective base station and a data network,
        select one of the multiple base stations as a serving base station for the terminal based on backhaul capabilities of the multiple base stations,
        determine an overall transmission capability of each of the multiple base stations based on transmission capability of a wireless direct or relay link for the base station and transmission capability of a wireless or wireline backhaul link for the base station, and
        select a base station with a largest overall transmission capability as the serving base station.

16. The apparatus of claim 15, wherein the at least one processor is configured to receive broadcast information from at least one of the multiple base stations, and to determine the backhaul capability of each base station based on the broadcast information.

17. The apparatus of claim 15, wherein the at least one processor is configured to select one of the multiple base stations based further on data requirements of the terminal.

18. The apparatus of claim 15, wherein the at least one processor is configured to select one of the multiple base stations based further on delay requirements of the terminal.

19. An apparatus for wireless communication, comprising:
    means for obtaining a list of multiple base stations detected by a terminal;
    means for determining backhaul capability of each of the multiple base stations, the backhaul capability being determined from one or both of an aggregate data rate or a transmission delay between each respective base station and a data network; and
    means for selecting one of the multiple base stations as a serving base station for the terminal based on backhaul capabilities of the multiple base stations, wherein the means for selecting one of the multiple base stations comprises:
    means for determining an overall transmission capability of each of the multiple base stations based on transmission capability of a wireless direct or relay link for the base station and transmission capability of a wireless or wireline backhaul link for the base station, and
    means for selecting a base station with a largest overall transmission capability as the serving base station.

20. The apparatus of claim 19, wherein the means for determining backhaul capability of each of the multiple base stations comprises:
    means for receiving broadcast information from at least one of the multiple base stations, and
    means for determining the backhaul capability of each base station based on the broadcast information.

21. The apparatus of claim 19, wherein the means for selecting one of the multiple base stations comprises means for selecting one of the multiple base stations based further on data requirements of the terminal.

22. The apparatus of claim 19, wherein the means for selecting one of the multiple base stations comprises means for selecting one of the multiple base stations based further on delay requirements of the terminal.

23. A computer program product, comprising:
    a non-transitory computer-readable medium comprising:
        code for causing at least one computer to obtain a list of multiple base stations detected by a terminal,
        code for causing at least one computer to determine backhaul capability of each of the multiple base stations, the backhaul capability being determined from one or both of an aggregate data rate or a transmission delay between each respective base station and a data network,
        code for causing at least one computer to select one of the multiple base stations as a serving base station for the terminal based on backhaul capabilities of the multiple base stations,
        code for causing at least one computer to determine an overall transmission capability of each of the multiple base stations based on transmission capability of a wireless direct or relay link for the base station and transmission capability of a wireless or wireline backhaul link for the base station, and code for causing at least one computer to select a base station with a largest overall transmission capability as the serving base station.

\* \* \* \* \*